(12) United States Patent
Boys et al.

(10) Patent No.: US 10,741,325 B2
(45) Date of Patent: Aug. 11, 2020

(54) INDUCTIVE POWER TRANSFER APPARATUS WITH AC AND DC OUTPUT

(75) Inventors: John Talbot Boys, Auckland (NZ); Grant Anthony Covic, Auckland (NZ); Daniel James Robertson, Auckland (NZ)

(73) Assignee: AUCKLAND UNISERVICES LIMITED, Auckland (NZ)

( * ) Notice: Subject to any disclaimer, the term of this patent is extended or adjusted under 35 U.S.C. 154(b) by 1017 days.

(21) Appl. No.: 13/992,757

(22) PCT Filed: Dec. 9, 2011

(86) PCT No.: PCT/NZ2011/000256
§ 371 (c)(1),
(2), (4) Date: Oct. 30, 2013

(87) PCT Pub. No.: WO2012/078055
PCT Pub. Date: Jun. 14, 2012

(65) Prior Publication Data
US 2014/0042821 A1    Feb. 13, 2014

(30) Foreign Application Priority Data
Dec. 20, 2010 (NZ) ........................................ 589865

(51) Int. Cl.
H01F 38/14 (2006.01)
H02J 50/12 (2016.01)
H04B 5/00 (2006.01)

(52) U.S. Cl.
CPC .............. *H01F 38/14* (2013.01); *H02J 50/12* (2016.02); *H04B 5/0037* (2013.01); *H04B 5/0081* (2013.01)

(58) Field of Classification Search
None
See application file for complete search history.

(56) References Cited

U.S. PATENT DOCUMENTS

| 5,293,308 A | 3/1994 | Boys et al. |
| 6,515,878 B1 | 2/2003 | Meins et al. |

(Continued)

FOREIGN PATENT DOCUMENTS

| DE | 102007042084 | 3/2009 |
| WO | WO 0118936 | 3/2001 |

(Continued)

*Primary Examiner* — Jared Fureman
*Assistant Examiner* — Joel Barnett
(74) *Attorney, Agent, or Firm* — Edell, Shapiro & Finnan, LLC

(57) ABSTRACT

An inductive power transfer system (IPT) pick-up comprises: a pick-up coil capable of generating a voltage by magnetic induction from a primary conductive pathway, and a tuning capacitor associated with the pick-up coil to provide a first pick-up resonant circuit; a first output associated with a first control means to substantially control the voltage or current provided by the first output; a further resonant circuit connected in series or parallel with the first pick-up resonant circuit; and a second output associated with a second control means to control the voltage or current provided by the second output and a method of providing an additional independently controllable output from an IPT pick-up having a resonant pick-up circuit is also disclosed.

17 Claims, 13 Drawing Sheets

(56) References Cited

U.S. PATENT DOCUMENTS

| | | | |
|---|---|---|---|
| 7,781,916 B2 | 8/2010 | Boys | |
| 2004/0130915 A1* | 7/2004 | Baarman | A61L 2/10 |
| | | | 363/21.02 |
| 2007/0109708 A1* | 5/2007 | Hussman | H02J 1/00 |
| | | | 361/113 |
| 2009/0243397 A1* | 10/2009 | Cook | H02J 5/005 |
| | | | 307/104 |
| 2011/0115303 A1* | 5/2011 | Baarman | H02J 17/00 |
| | | | 307/104 |
| 2012/0200169 A1* | 8/2012 | Urano | H02J 5/005 |
| | | | 307/104 |
| 2012/0217111 A1* | 8/2012 | Boys | H01F 38/14 |
| | | | 191/10 |
| 2012/0248981 A1* | 10/2012 | Karalis | H03H 7/40 |
| | | | 315/70 |
| 2013/0119777 A1* | 5/2013 | Rees | H01F 38/14 |
| | | | 307/104 |
| 2015/0091389 A1* | 4/2015 | Byrne | H02J 5/005 |
| | | | 307/104 |

FOREIGN PATENT DOCUMENTS

| | | |
|---|---|---|
| WO | WO 2004105207 | 12/2004 |
| WO | WO 2010030195 | 3/2010 |

\* cited by examiner

INDUCTIVE POWER TRANSFER APPARATUS WITH AC AND DC OUTPUT

REFERENCE TO RELATED APPLICATIONS

The present disclosure is based on and claims benefit from International Application Number PCT/NZ2011/000256 filed on Dec. 9, 2011 which claims benefit from New Zealand application 589865 filed Dec. 10, 2010, the entire contents of each of which are herein incorporated by reference.

FIELD

This invention relates to inductive power transfer (IPT) systems, and has particular application to circuits of IPT systems which receive power inductively from the IPT system primary track, commonly referred to as IPT pick-up circuits.

BACKGROUND

IPT systems are well known. The operation of such systems in described, for example, in U.S. Pat. No. 5,293,308, the disclosure of which is incorporated herein by reference. IPT systems typically have a primary conductor (often in the form of a pathway or track) which is energised with an alternating current so that a time-varying magnetic field is produced. One or more pick-up circuits are provided which receive power inductively from the primary conductor. Each pick-up includes a pick-up coil in which a voltage is induced from the primary conductor. The pick-up coil is tuned with a tuning capacitance to be resonant at the frequency of the current in the primary conductor. An output of the pick-up supplies a load.

In some applications it is desirable to have a significant power supply of both alternating current (AC) and direct current (DC) as independently controllable outputs of a single pick-up device. One example is that of powering a class of luminaries commonly called "Intelligent Lights", for which both DC and AC power are required. In contrast to conventional lights, Intelligent Lights have motors and control circuitry which require a DC source in addition to the AC power driving the lamp itself. Various lamps are commonly used for such purpose that can include 1.2 kW AC supply for driving the lamp, a 24V, 200 W DC supply is required to run the control circuits.

U.S. Pat. No. 7,781,916 discloses an IPT system pick-up which provides two independently controllable outputs. As stated in that publication, the intention is to provide two DC outputs, one being a high voltage DC output for supplying a primary load, and the second output being a low voltage DC output which is only required for low power purposes such as supplying control circuitry. The problems exists that the circuit disclosed in U.S. Pat. No. 7,718,916 is unsuitable for providing two or more significant power supplies, and is not satisfactory for providing an efficient high power AC power supply as well as an DC supply.

Object

It is an object of the present invention to provide an IPT pick-up, or an IPT system including a pick-up, which overcomes or ameliorates one or more the disadvantages of existing constructions. Alternatively, it is an object of the present invention to at least provide a useful alternative to existing constructions.

SUMMARY

Accordingly in one aspect of the invention there is provided an IPT pick-up comprising:

a pick-up coil capable of generating a voltage by magnetic induction from a primary conductive pathway, and a tuning capacitor associated with the pick-up coil to provide a pick-up resonant circuit;

a first output associated with a first control means to substantially control the voltage or current provided by the first output;

a further resonant circuit connected in series or parallel with the pick-up resonant circuit; and a second output associated with a second control means to control the voltage or current provided by the second output.

Preferably the first output and second output are independently controllable.

Preferably the first output is associated with the pick-up resonant circuit, and the second output is associated with the further resonant circuit.

Alternatively, the first output is associated with the further resonant circuit and the second output is associated with the pick-up resonant circuit.

Preferably one of the outputs comprises an AC output and the other output comprises a DC output.

Preferably the DC output is provided by the first or second control means functioning as a buck, boost or buck-boost convertor.

Preferably the AC output is provided by the first or second control means introducing a phase delay.

In a further aspect of the invention there is provided an IPT system comprising:

a primary conductive pathway for energisation by a power supply; and an IPT pick-up comprising:

a pick-up coil capable of generating a voltage by magnetic induction from a primary conductive pathway, and a tuning capacitor associated with the pick-up coil to provide a pick-up resonant circuit;

a first output associated with a first control means to substantially control the voltage or current provided by the first output;

a further resonant circuit connected in series or parallel with the pick-up resistant circuit; and a second output associated with a second control means to control the voltage or current provided by the second output.

In a further aspect of the invention there is provided a method of providing an additional independently controllable output from an IPT pick-up, the method comprising:

connecting an additional resonant circuit in series or parallel with a resonant pick-up circuit; and providing a controller to control the output of the additional resonant circuit. Further aspects of the invention will become apparent from the following description.

DRAWING DESCRIPTION

One or more embodiments of the invention will be described further below by way of example with reference to the accompanying drawings, in which.

Figure 21:
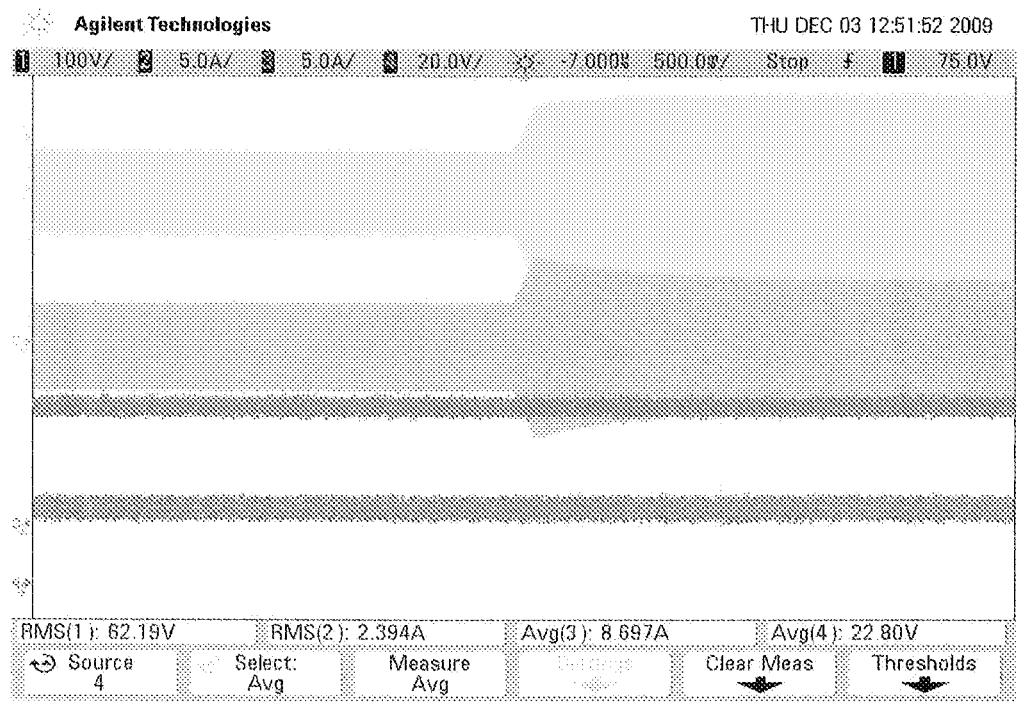

FIG. 21 is a diagram showing DC output current (trace 3) and voltage (trace 4) as AC output current (trace 2) and voltage (trace 1) is reduced.

Figure 22:
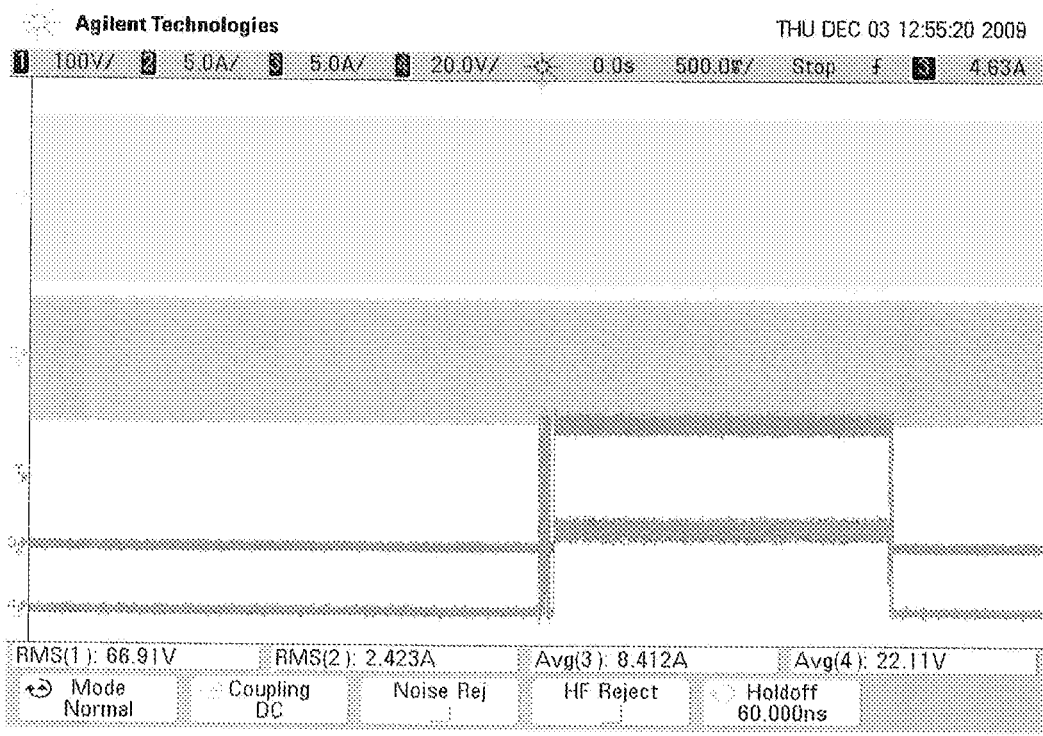

FIG. 22 is a diagram showing the effect of a step in DC load current (trace 3) on AC output voltage (trace 1) and current (trace 2).

DESCRIPTION OF ONE OR MORE PREFERRED EMBODIMENTS

In this specification circuits that allow for independent AC and DC outputs to be realised from a single pick-up receiver are disclosed, and a working parallel tuned circuit topology with independent AC and DC controlled outputs is shown as one example of the possibilities disclosed herein.

Figure 1:
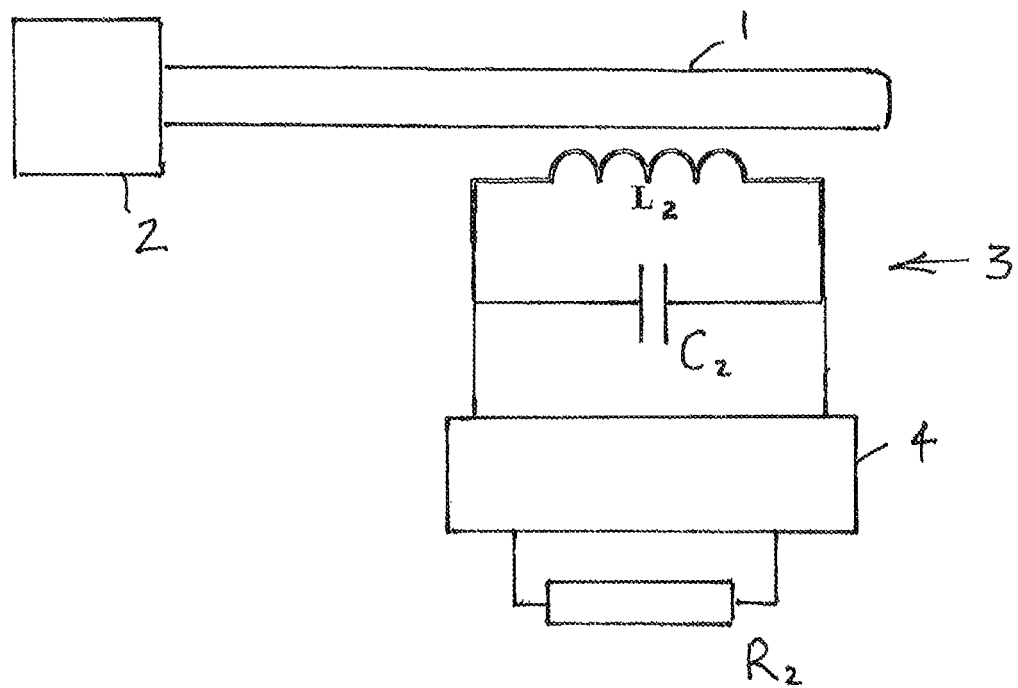
FIG. 1 is a schematic diagram of an IPT system.

Referring to FIG. 1, an IPT system is shown in diagrammatic form. A primary conductor 1 (often in the form of a pathway or track) is energised with an alternating current using a power supply 2 so that a time-varying magnetic field is produced. One or more pick-up circuits 3 are provided which receive power inductively from the primary conductor. Each pick-up includes a pick-up coil $L_2$ in which a voltage is induced from the primary conductor 1. The pick-up coil $L_2$ is tuned with a tuning capacitance $C_2$ to form a series or parallel resonant circuit which is resonant at the frequency of the current in the primary conductor 1. A controller 4 is typically used to condition the power derived from the resonant circuit to provide an appropriate supply to a load $R_2$, such as a lamp or a motor for example.

Series tuned pick-up coils have particular advantages where low voltage, high current AC output is required, the series tuned version of an AC-AC Processing pick-up is introduced and forms the basis for some of the proposed dual output topologies. Such circuits also behave as an ideal voltage source when operated at resonance, so they are ideally suited to applications such as incandescent stage lighting because the initial surge of current required to heat the lamp up quickly can be provided by operating temporarily at a high Q, which will then fall as the lamp's resistance increases.

Figure 2:
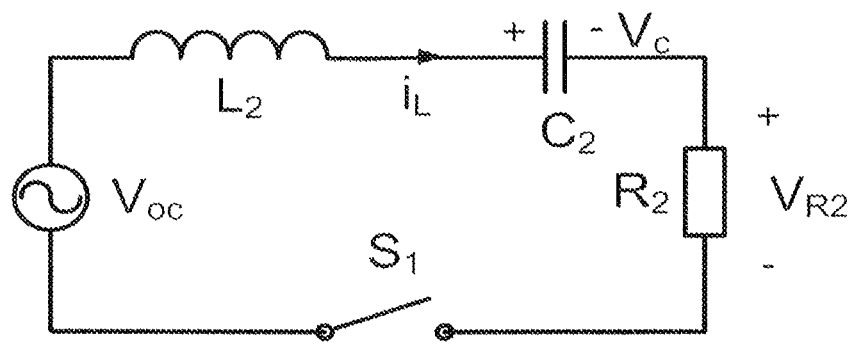
FIG. 2 is a diagrammatic representation of a series tuned AC-AC control implementation for an IPT pick-up.
Figure 3:
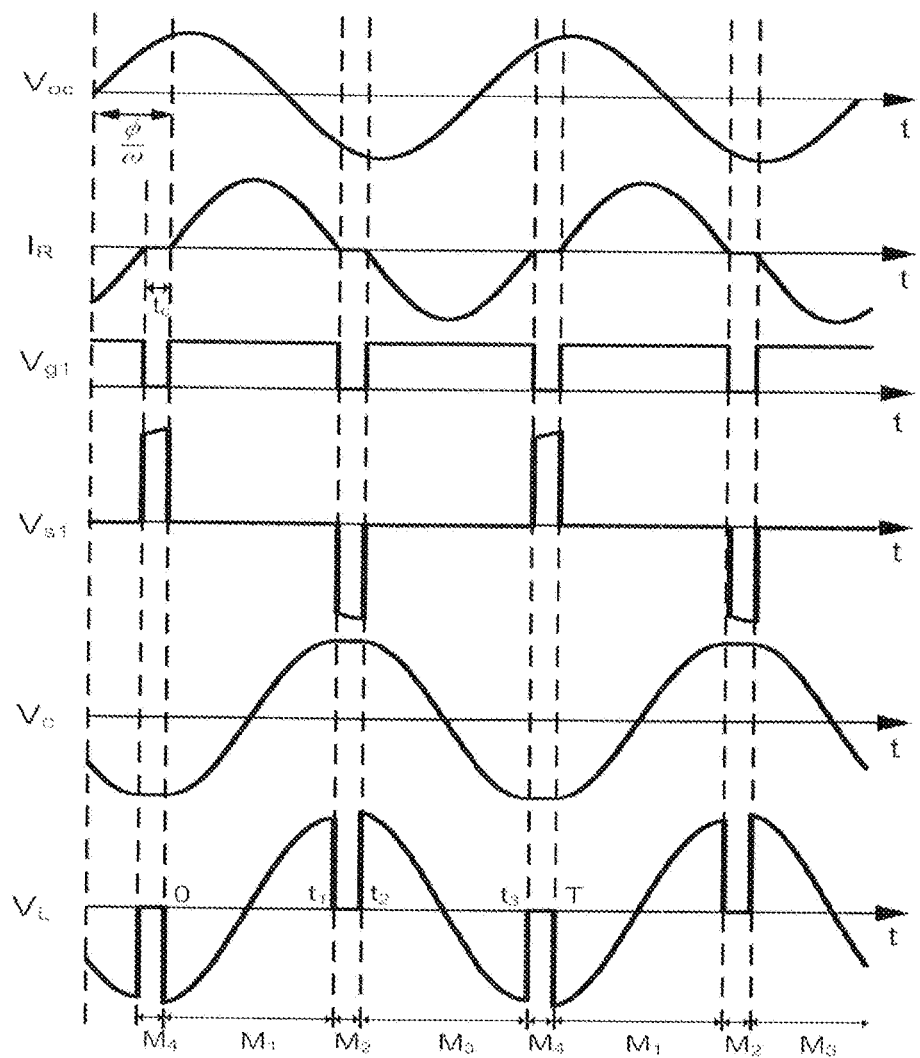
FIG. 3 shows resonant wave forms for the pick-up topology of FIG. 2.

The series tuned form of AC-AC Processing pick-up is shown in its most basic form in FIG. 2 with an AC output voltage ($V_{R2}$). Capacitor $C_2$ is tuned to inductor $L_2$ at the frequency of the primary track current $i_1$ to form a series resonant tank. The open circuit voltage source ($V_{oc}$) represents the induced voltage of the pickup. For simplicity, switch $S_1$ is drawn as an ideal AC switch and it is the basis for controlling the output voltage To illustrate the circuit's operation, FIG. 3 shows the one period operation of the series AC processing pickup at each particular switching interval. $V_{g1}$ is the PWM control signal which turns $S_1$ on and off. Consider the situation where $V_{g1}$ is controlled with a phase delay ϕ relative to the phase of $V_{oc}$ as shown in FIG. 3. In Mode 1 ($M_1$, $0<t\leq t_1$), $S_1$ is operated by being turned on and the capacitor $C_2$ resonates with pickup inductance $L_2$ like a series resonant tank and the inductor current reaches a peak value and returns back to zero. When the inductor current reaches zero, $S_1$ is operated by being turned off and the circuit enters Mode 2 ($M_2$, $t_1<t\leq t_2$). In this mode, no current flows through any device and the inductor current is discontinuous, i.e. substantially zero for a selected time period, for a phase known as the discontinuous phase ($t_c/\omega$) at the point where $I_R$ (the current through the resistor $R_2$) changes from a positive to a negative voltage. In the beginning of Mode 3 ($M_3$, $t_2<t\leq t_3$), $S_1$ is turned back on. Similar to $M_1$, the circuit operates like a series resonant tank and current flows into the load resistor. In Mode 4 ($M_4$, $t_3<t\leq T$), similar to $M_2$, the resonant cycle is terminated and the inductor current is discontinuous. After this mode, the circuit returns back to $M_1$, repeating the switching process. Therefore, the switching action from the equivalent AC switch generates a phase shift between the open circuit voltage and the inductor current waveform.

The series tuned AC processing pickup also achieves near ideal soft switching conditions. From FIG. 3, at $t_1$, the voltage across $S_1$ decreases from zero to a negative voltage while the current through it is at zero. Because there is no current flow, Zero-Current-Switching (ZCS) is achieved at turn off. When $S_1$ is turned on at $t_2$, the pickup inductor in series with $S_1$ forces the current through it to increase slowly in the negative direction while the voltage across it decreases to zero. For most practical switches, the turn on is much faster than the rate of increase of the inductor current, so the di/dt through the switch is relatively small and a near zero current switch on condition is obtained. In summary, if the timing of the gate drive signal for the AC switch is accurate, the AC processing pickup achieves near perfect soft switching conditions. The soft switching condition gives the pickup desirable characteristics such as low switching losses, low switching stress and reduced electromagnetic interference (EMI) levels. It can be seen that the phase shift between $V_{oc}$ and $I_L$ can be controlled by adjusting the phase delay ϕ.

The peak of the inductor voltage ($V_L$) is also the peak switch voltage, thus as the open circuit voltage ($V_{oc}$) or the operational Q increases, the voltage rating of the switch must also increase. The inductor voltage for a series tuned circuit is given by:

$$V_{L2(series)} = V_{oc}\sqrt{(Q_2^2+1)}$$

Thus the voltage rating of the AC switch is: $\sqrt{2}V_{oc}\sqrt{(Q_2^2+1)}$.

Figure 4:
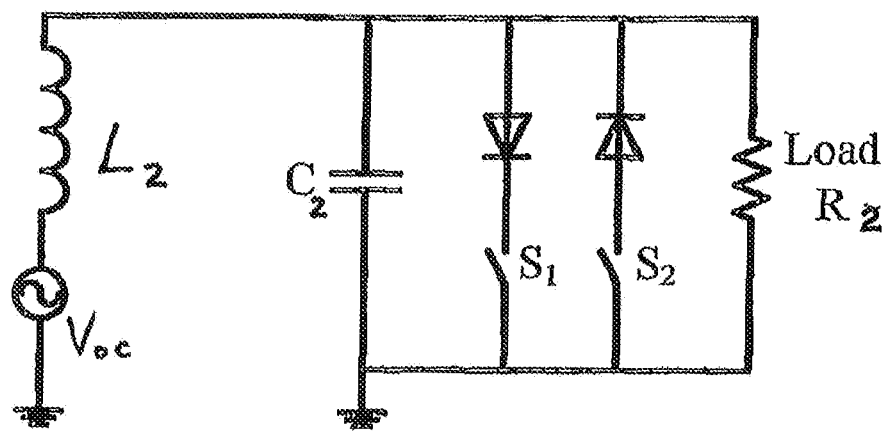
FIG. 4 is a diagrammatic representation of a parallel tuned AC-AC control implementation for an IPT pick-up.

Another form of AC processing control, which is referred to in this specification for purposes of convenience as a parallel tuned AC controller, is discussed in patent publication WO 2010/030195. The disclosure of WO 2010/030195 is incorporated herein by reference. The parallel tuned AC control strategy includes a pick-up circuit as shown in FIG. 4 in which $L_2$ and $C_2$ comprise a parallel resonant circuit. Switches $S_1$, and $S_2$, are in series with diodes $D_1$ and $D_2$, and with $C_2$, as shown in FIG. 4. These switches are operated to disrupt the action of the circuit such that a controlled phase delay occurs. The technique for achieving this is to maintain voltage $V_2$ at a substantially constant level for a selected time period, for example to clamp voltage $V_2$ so that it cannot cross zero until the switches so allow. Thus Switch $S_1$ prevents a rise in the positive voltage across the tuning capacitor $C_2$ and switch $S_2$ prevents the voltage across the tuning capacitor from going negative. As can be seen from FIG. 5, switches $S_1$ and $S_2$ are switched on or off for 180 degrees but are delayed in phase relative to the normal voltage in the circuit. The overlap between the normally resonant voltage and the switching waveform is θ. Switch $S_1$ is on for most of the negative half cycle of the waveform—where it has no effect—and for a small portion of the normal positive half cycle where it prevents any voltage rise until it turns off. Switch $S_2$ operates in the other half cycle in an exactly complementary way. Both switches are on for 180 degrees but there is no overlap at all. The actual output voltage has small flat periods in it during the angle θ but for high Q conditions these almost disappear. However the waveform is still displaced and therefore the power transferred is reduced in a controllable fashion. Thus, θ can be implemented by controlling the switches $S_1$ and $S_2$ to activate as required to hold the tuning capacitor voltage at a desired level for selected intervals. In one embodiment, the tuning capacitor voltage is clamped for a selected time period in each cycle of the resonant circuit. In other embodiments the capacitor voltage may be clamped for selected time periods in selected cycles. In one embodiment the voltage at which the tuning capacitor is clamped is substantially zero volts.

Generating Independent AC and DC Outputs in a Single Pick-Up Structure

To provide both DC and AC sources from one inductive pick-up, two broad options are available, namely: two independent pick-up coils and controllers, or one pick-up coil with additional circuitry to produce the two outputs.

Conceptually the simplest option for providing independent AC and DC outputs is to build two separate pick-ups, one outputting AC and one DC. While this may be simpler from an electronics point of view, it presents two additional problems. Namely, that building two pick-up coils on a common ferrite core or on separate but adjacent cores will be more expensive, and secondly that there will likely be undesirable cross-coupling between the two pick-up coils, given they will necessarily be in close proximity for practical use.

Cross coupling between two independent coils reduces a pick-up's efficiency, increases component costs or necessitates undesirable physical separation. Alternating current in one coil will induce a voltage in a coupled coil.

Figure 6A:
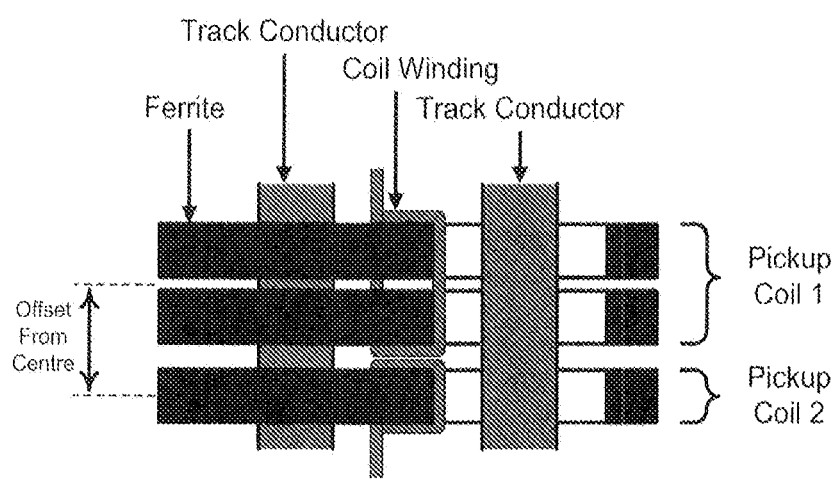
FIG. 6(a) is a diagrammatic illustration of an experimental set up for pick-up coil cross coupling.
Figure 6B:
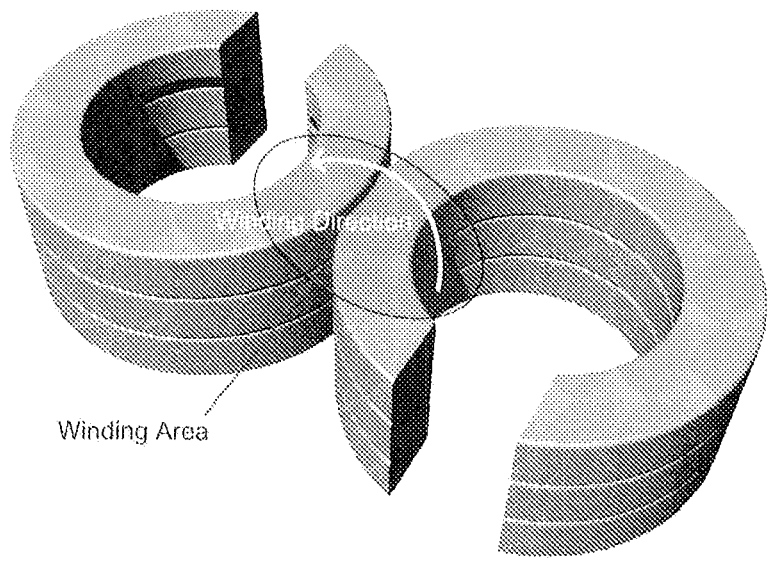
FIG. 6(b) is a perspective view of the ferrite construction of FIG. 6(a).

As an example, suppose two pick-up coils are positioned on the primary conductive pathway (i.e. a track in this example) as close together as permitted by their windings, as shown in FIG. 6(a), while their actual 3-dimensional structure as shown in FIG. 6(b) is that of three S shaped ferrites placed in close proximity (as similarly depicted in FIG. 6(a)). For this work each S-ferrite is constructed using two cut ferrite torroidal cores to allow them to be placed over the track conductors. In FIG. 6(a) the three S-shaped ferrites pieces are placed in close proximity around a single primary track conductor and its return path (both labelled as the track conductor). Pick-up coil one is wound around two of the s-shaped ferrites which are glued together to form a single ferrite pick-up, while pick-up coil 2 is wound around a single s-ferrite pick-up. The two pick-ups proximity is indicated by the distance "Offset from centre" in FIG. 6(a).

The use of two separate pick-up coils is more expensive than building a single, more powerful coil. The power capacity of a pick-up of a certain profile is roughly proportional to the volume of ferrite used as indicated by the data of Table 1 below. The additional ferrite volume required to change a 1.2 kW pick-up coil into a 1.4 kW pick-up coil is only 17%. The added expense of creating a second, independent, 200 W pick-up coil instead is likely to be greater than this.

The coupling coefficient k of two coils on a common piece of ferrite, or on separate pieces of ferrite but located in close proximity can be calculated using:

$$k = \sqrt{1 - \frac{L_{1,short}}{L_{1,open}}}$$

Here $L_{2,short}$ is the inductance of Coil 1 while the windings on Coil 2 are shorted and $L_{1,open}$ is the inductance of Coil 1 when the windings on Coil 2 are an open circuit.

Figure 7:
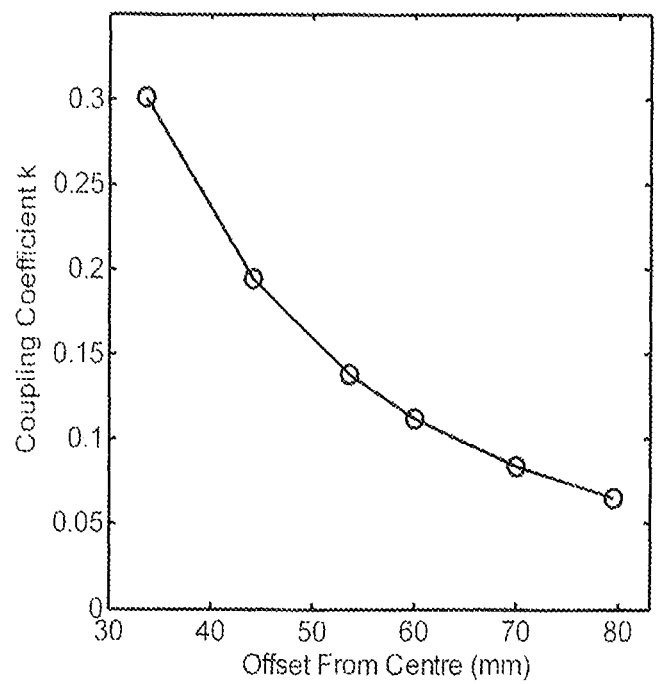
FIG. 7 is a graph showing cross coupling between two "S" pick-up coils.

In the case of FIG. 6(a) one of the pick-up coils used to gather this data is 26 mm thick, as may be required to produce a 1.2 kW AC output (as indicated by pick-up coil 1 in FIG. 6(a)), and the other pick-up was 13 mm thick as might be required to produce a 200 W DC output (as indicated by pick-up coil 2 in FIG. 6(a)). Full specifications for these pick-up coils are given in Table 1 below. A coupling coefficient of 0.30 was measured and corresponds to when the two pick-up coils were placed as close as possible together, with centres offset by 33.5 mm. The degree of such cross coupling varies with proximity of the ferrites as shown in FIG. 7.

TABLE 1

Specification for "S" Pick-up Coils of Varying Thickness when the primary track is energised with 125 A at 20 kHz. NB: a 39 mm wide S pick-up is created using three S cores glued together as shown in FIG. 6(a)

| | Pick-up Thickness (mm) | | |
|---|---|---|---|
| | 13 | 26 | 39 |
| Volume of Ferrite (cm³) | 80.5 | 161.0 | 241.5 |
| Su (VA) | 353.6 | 495.8 | 616.6 |
| Voc (V) | 56.8 | 84.9 | 84.8 |
| Isc (A) | 6.23 | 5.86 | 7.27 |
| Inductance (μH) | 72.6 | 115.7 | 92.8 |
| Core Area (m²) | 0.416 × 10−3 | 0.832 × 10−3 | 1.25 × 10−3 |
| $B_{sat}$ (approx.) (T) | 0.24 | 0.24 | 0.24 |
| No of turns (approx.) | 14 | 15 | 12 |
| Pmax (approx.) (kW) | 0.773 | 1.56 | 2.33 |

The mutual inductance (M) between pick-up coil 1 and pick-up coil 2 of FIG. 6(a) can be calculated using:

$$M = k\sqrt{L_1 L_2}$$

Here k is their coupling coefficient as described earlier, and $L_1$ and $L_2$ are each coil's respective self inductance. The open circuit voltage induced in one of the coils when a current is flowing in the other coil can be simply calculated as shown below. For close coupling M can be calculated to be 27.5 uH. As such the open circuit voltage induced in the smaller (13 mm thick coil "2") when the larger coil "1" has 20 A flowing in it at 20 kHz, can be determined as:

$$V_{2,induced}=j\omega M 1_{coil1}=j69.1 \text{ Volts}$$

The open circuit voltage of this 13 mm coil on its own is only 56.8V when it is coupled to a track and the track has 125 A at 20 kHz flowing in it as indicated in Table 1. An additional coupled voltage of 69.1V contributed from a second larger coil in close proximity represents an undesirable amount of variability in the open circuit voltage of this 13 mm coil and coupling that can vary if this second larger coil is decoupled during operation due to control means as described for example in U.S. Pat. No. 5,293,308. This variability would introduce additional losses and greater component costs. The phase and amplitude of the additional coupled voltage will also vary as the power demand of the larger pick-up changes, given the current flowing in that pick-up coil depends on its state of resonance (the amount of operating Q), its tuning and load.

The two pick-up coils can be separated to reduce the cross-coupling, at the expense of increasing the total pick-up coil bulk. As described earlier, FIG. 7 shows how the coupling coefficient between two "S" pick-up coils changes as the separation between them is increased. If a 6.6% cross-coupling coefficient was considered permissible, the required offset of the centre axes of the "S" pick-up coils is around 80 mm, Allowing for the width of the ferrite plus 10 mm for windings on either side (for the two independent outputs) results in a total secondary receiver width of 119 mm. This could easily be unacceptably bulky for many practical applications.

Aluminium screening to reduce cross-coupling could be used, but is not discussed in detail here as it is desirable to retain a pick-up profile that is easily able to be attached to a track (in the case of an "S" shape this becomes more difficult as any screening must follow the "S" shape) and limits the potential use of such aluminium screening. Furthermore the placement of an aluminium screen in close proximity can introduce undesirable loss, and ideally this should be avoided where possible.

A novel solution that produces both AC and DC outputs from a single pick-up coil is proposed to overcome the above problems.

Producing AC and DC with Two Outputs from One Pick-Up

Figure 8:
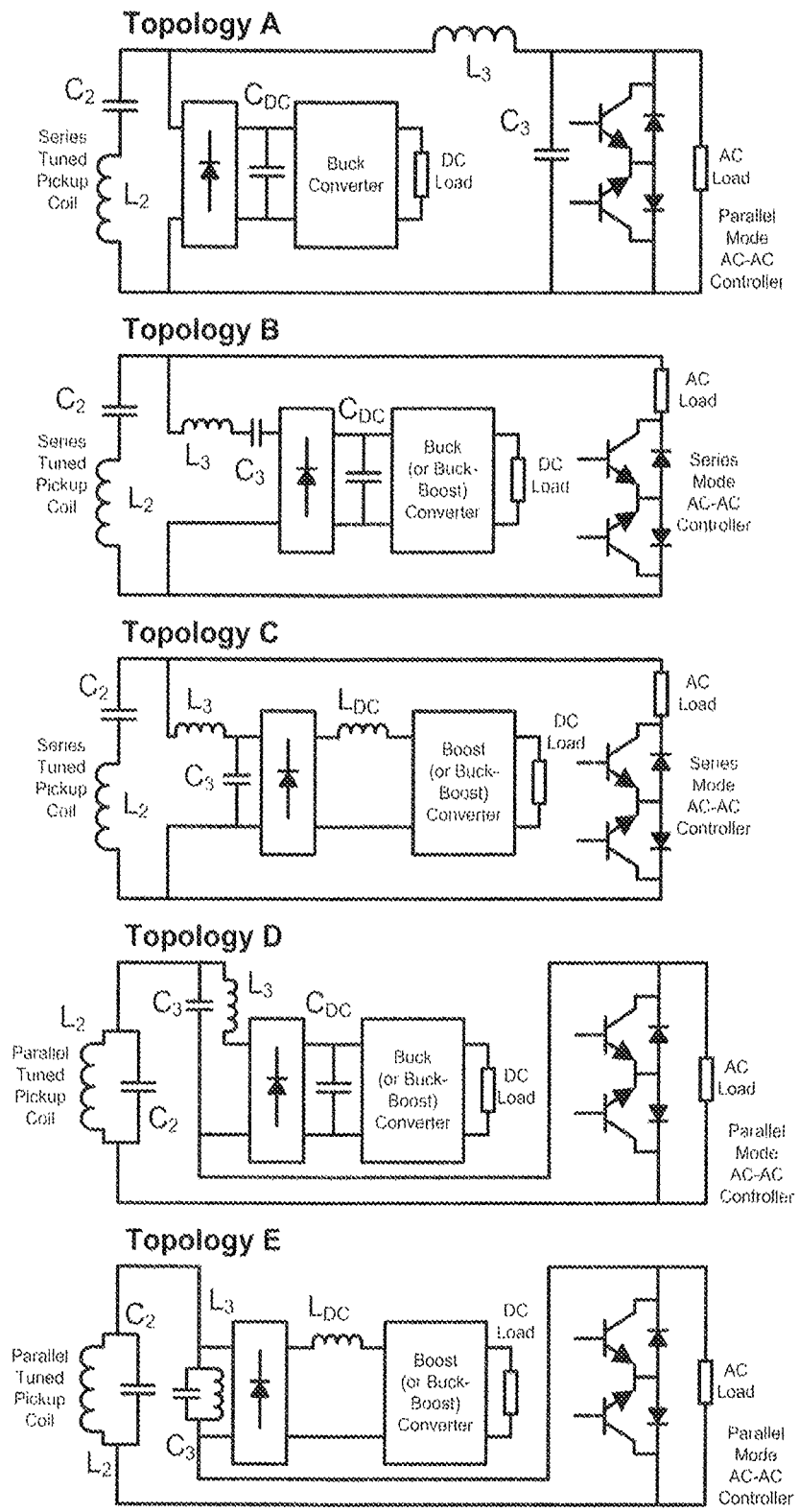
FIG. 8 shows a selection of pick-up topologies for providing a dual AC and DC output.

Several novel topologies capable of outputting independently controlled AC and DC have been identified for series or parallel tuned pick-up inductors and these are shown diagrammatically in FIG. 8. These represent a significant departure from known pick-up topologies which have only a single resonant circuit. Other similar topologies could also be created for pick-ups that use more complex tuning topologies such as those having LCL or LCC networks as part of the pick-up circuit, and therefore the proposed solutions are not restricted to the examples discussed herein.

It should be noted that a problem which arises when using a controller that can output controlled AC from a pick-up alongside a controller that outputs controlled DC from the same tuned pick-up coil structure, is that the action of the AC controller can create spikes in the pick-up coil resonant capacitor's current or pick-up coil inductor's voltage (for the parallel or series tuned AC-AC Controller varieties respectively). These spikes should be blocked from entering the DC output section otherwise there will be increased component strain and increased cross coupling between AC and DC outputs.

Figure 5:
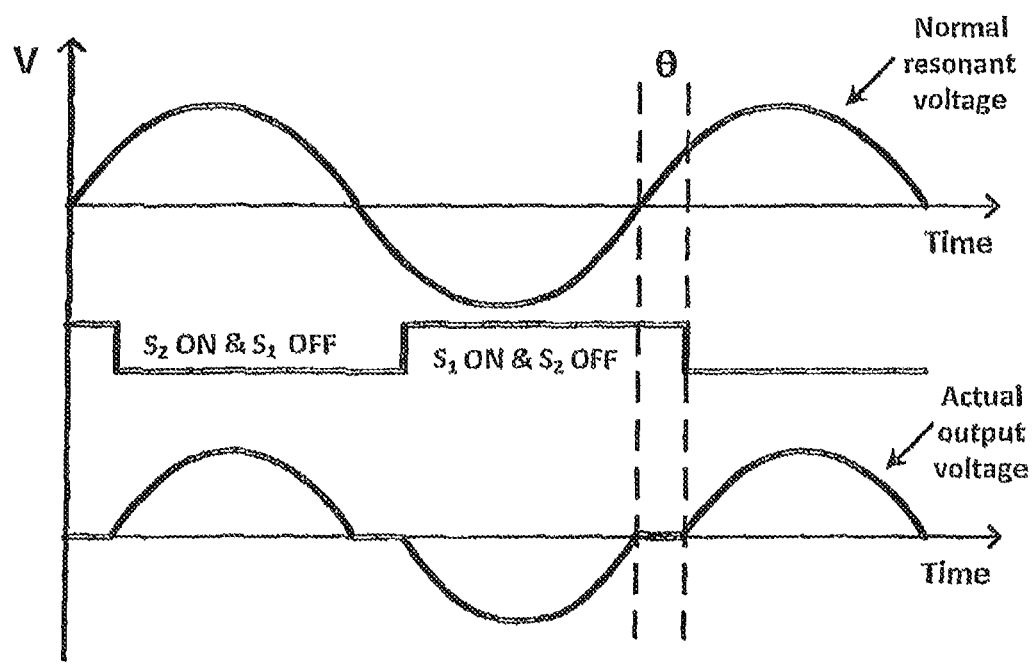
FIG. 5 shows resonant wave forms for the pick-up topology of FIG. 4.

The switch arrangement used for the parallel tuned AC control shown in FIG. 8 differs slightly to that discussed above with reference to FIG. 4, but those skilled in the art will appreciate that the parallel AC control circuits shown in FIG. 8 can be controlled using the principles described with reference to FIGS. 4 and 5 to provide the required output.

A description of the method of operation of each of the topologies shown in FIG. 8 is discussed below.

Still referring to FIG. 8, in Topology. A, the pick-up coil is fully series tuned with a capacitor chosen to resonate with the pick-up coil at the track frequency. This forms resonant pick-up circuit. This L-C combination acts as a voltage source equal to Voc, allowing the rest of the circuit to draw as much or as little current as required. The DC output section then represents the well understood series tuned IPT pick-up for example, as described in U.S. Pat. No. 5,293, 308. The AC output section uses a second L-C (i.e. a further resonant circuit) to step up the voltage from Voc to the voltage required to operate the lamp, around 220V. By shorting the load and capacitor for periods of the resonant cycle, AC power output is controlled, as in a single output AC-AC Processing pick-up design. The major shortcoming of this system is that the second inductor must be large because it must accept a sizable resonant current without saturating. For a 1.2 kW prototype tested, this current can be around 21 A RMS. The pick-up short circuit current (Isc) and the resonant current are related by the operating Q of the secondary ($Q_2$), and this relationship is given by:

$$I_{L_2}=I_{sc}\sqrt{Q_2^2+1}$$

Topology B also has a pick-up coil that is fully series tuned with a capacitor chosen to resonate with the pick-up coil at the track frequency. As shown this is used directly to create a "series mode" AC-AC controller to regulate the power delivered to the AC load. This removes the large resonant inductor ($L_3$ of Topology A) and means the system can be physically much smaller. An additional $L_3$ and $C_3$ are introduced to the input of the DC output branch, and are designed such that they are also resonant at the track frequency (i.e. they provide a further resonant circuit). As such they block voltage spikes (present due to the action of the AC-AC processing controller) from reaching the rectifier bridge, while allowing the buck converter to draw as much current as is required without the input voltage to the rectifier bridge sagging. For low AC output voltages, this system can be an excellent option. With 220-240 RMS output voltages as required by some lamps (and with significantly higher peak voltages due to the non-sinusoidal output voltage) and a operating $Q_2$ of 3, the peak voltage that the switch must block given $V_{L_2series}=V_{oc}\sqrt{Q_2^2+1}$, can rise excessively to well in excess of 1 kV which limits the usefulness of this circuit unless better semiconductor technology is available for such loads. A buck-boost converter can be used where DC output voltages in excess of Voc are required however the simpler buck converter shown will work in cases where the desired DC output voltage is less than Voc.

Topology C also makes use of a "series mode" AC-AC controller to regulate the power delivered to the AC load. Operation is similar to Topology B, although here a boost controller topology is used to regulate the DC output voltage enabling larger output DC voltages than Voc. The DC inductor $L_{DC}$ must maintain approximately constant current at the track frequency, so it must be larger than the DC inductor required by the buck converter of Topology B, and this is described more fully later.

In Topology D a resonant L-C pair is used before the rectifier bridge. This allows the current spikes drawn by the AC-AC processing part of the circuit to pass the DC section via the capacitor. Because the inductor resonates with the capacitor, current can be drawn by the DC-DC converter without its input voltage sagging significantly. By correctly sizing capacitor $C_3$ the required rectified DC voltage can be obtained, as described more fully later.

The circuit of Topology E has similar properties to Topology D, and due to the boost converter it can produce higher DC output voltages. However, a buck-boost converter is required should a DC output current above $I_{sc}$ be desired. The DC inductor $L_{DC}$ must also maintain approximately constant current at the track frequency, so it must be larger than the DC inductor in the buck converter in Topology B, which can switch at higher frequencies.

The topologies discussed above could all be used in varying applications. However the specifications of particular applications will tend to suit different topologies as indicated by the example in the following discussion.

Due to the wide range of available topologies for producing independent AC and DC outputs a set of selection criteria are proposed to assist with choosing the optimal topology for a given set of design parameters. If as an example, a pick-up requiring 1200 W AC and 200 W DC is required for a lighting application where typically the higher power output is a controlled AC output for a lamp, and a lower powered DC output is required to operate a motor or such for movement. In such a case:

1. the higher powered 1200 W AC pick-up output must have high efficiency given 86% of the pick-up's rated output power is in the form of AC and it will have the greatest impact on the overall system efficiency.
2. The pick-up DC regulator should be able to produce $I_{dc} > I_{sc}$. In such cases $I_{sc}$ is often less than the rated DC current output required by a DC load, because lamps operate with high AC voltages and as such the pick-up coil is commonly wound to ensure the higher AC voltages can be met. In such circuits there must be some capability to increase the DC output current.
3. There should be minimal cross coupling between the AC and DC outputs as it is undesirable that a change in the DC load should cause a change in the AC output voltage or vice versa. While this problem could be combated with careful controller design, a decoupled circuit topology is preferred.

A comparison of component ratings for each of the proposed topologies to meet the above criteria is required. The required component ratings in the circuits should be easily met with available devices. While some topologies may seem useful at first glance, excessive voltages or currents may be developed in semiconductor devices which could limit that circuit's applicability.

The final design should ideally have a minimum of bulky components. In such a case the largest and most expensive components are likely to be inductors and the Litz wire used to wind them. By using higher frequencies in the DC production and a minimum of inductors in the AC output path, where possible, the total volume of inductors can be reduced.

DESIGN EXAMPLES

To further clarify the problem, two different design parameters that are relevant to stage lighting will be investigated with AC voltage extremes.

The first is a 220V, 1200 W AC load along with a 24V, 200 W DC load corresponding to a high voltage tungsten halogen lamp commonly available, running in an intelligent light setup.

The second is a 80V, 1200 W AC load along with a 24V, 200 W DC load. This corresponds to the bulb with the lowest rated voltage that OSRAM supplies at the 1200 W level, running in an intelligent light setup.

The design parameters and possible choices are described below.

Design Example A

Here the circuit topology choice for driving a 220V Lamp in an intelligent light requires two independent outputs: 220V, 5.5 A AC and 24V, 8.4 A DC.

As summarized in Table 2 below, while Topology A will deliver the required AC and DC power, it is impractical because the second inductor (L3) is physically large. This is because L3 must accept a current which will be of a similar amplitude to the resonant current in L2. Topologies B and C are inappropriate because the blocking voltage of the switches must be in excess of 1 kV for the required output voltages to be delivered. Topology D has no serious drawbacks. Topology E could be practical as well, however, since the voltage boost which Topology E's buck-boost converter provides is not required here, the buck converter in Topology D is preferred.

TABLE 2

Circuit Topology Comparison for Producing 220 V, 1200 W AC and 24 V, 200 W DC

| Criterion | Topology | | | | |
| --- | --- | --- | --- | --- | --- |
| | A | B | C | D | E |
| High Efficiency 1200 W AC Pick-up | yes | yes | yes | yes | yes |
| Can Produce IDC > Isc | yes | yes | yes | yes | yes |
| Minimal Cross Coupling Between AC and DC | yes | yes | yes | yes | yes |
| Component Ratings are Easily Met | yes | no | no | yes | yes |
| Minimum of Bulky Components | no | yes | yes | yes | no |

Design Example B

Here the circuit topology choice for driving an 80V lamp in an intelligent light requires two independent outputs: 80V, 15 A AC and 24V, 8.4 A DC.

As summarized in Table 3, Topology A is unsuitable in this case as the inductor current in $L_3$ will be large, resulting in a bulky, expensive inductor. Further, the track, pick-up inductor and switch currents will be large, resulting in significant losses. Topology B is an excellent choice as the DC output section requires only two small inductors in addition to the pick-up coil inductor. Because the DC output voltage is well below Voc, a simple buck converter can be used in Topology B. Topology C will also work but L3 will have to be rated for approximately the full DC output current (unless a buck-boost converter is used), which is not the case in Topology B. Topology D is a poor choice because the current through the AC switch will be $Q_2 I_{sc}$ with the peak current being $\sqrt{2}$ larger. As an example, if $Q_2$ was 3 and the short circuit current of the pick-up coil was 18 A (somewhat larger than the maximum rated lamp current to allow for fast turn on), then the peak switch and capacitor current would be 76 A, with the peak pick-up inductor current being somewhat larger. This will cause potentially unacceptable losses on PCB tracks, pick-up inductor windings and switches. Topology E suffers from an identical problem, having excessive resonant pick-up coil current, as in Topology D.

TABLE 3

Circuit Topology Comparison for Producing 80 V,
1200 W AC and 24 V, 200 W DC

| | Topology | | | | |
|---|---|---|---|---|---|
| Criterion | A | B | C | D | E |
| High Efficiency 1200 W AC Pick-up | no | yes | yes | no | no |
| Can Produce IDC > Isc | yes | yes | yes | yes | yes |
| Minimal Cross Coupling Between AC and DC | yes | yes | yes | yes | yes |
| Component Ratings are Easily Met | yes | yes | yes | yes | yes |
| Minimum of Bulky Components | no | yes | no | yes | yes |

Understanding the DC Output Design

As well as the main pick-up coil and compensating capacitor, topologies B, C, D and E all use a second resonant inductor-capacitor pair to provide a stable voltage and current for a DC-DC converter. This voltage or current is largely independent of the power drawn by the DC load or the AC-AC processing section of the circuit. These resonant elements can be understood in terms of well known IPT pick-up analysis techniques.

The analysis and understanding of series and parallel tuned IPT pick-ups which produce DC can be simplified under suitable operating conditions enabling the rectifier bridge and all subsequent components through to the DC load to be modelled as a single equivalent power resistor, provided that certain conditions are met. For a series tuned circuit powering a buck converter, the DC capacitor after the rectifier bridge must be large enough to ensure an approximately constant voltage across the output of the rectifier bridge. For a parallel tuned circuit powering a boost converter, it is a condition that the inductor following the rectifier bridge is large enough to ensure an approximately constant current through the bridge. Provided that these conditions are met, the rectifier, DC-DC converter and load can be replaced by a resistor for modelling purposes. The relationship between the resistive load following the rectifier bridge and the equivalent AC resistor is given by $$R_{AC} = \frac{\pi^2}{8} R_{DC}$$

in the case of a parallel tuned pick-up and $$R_{AC} = \frac{8}{\pi^2} R_{DC}$$

in the case of a series tuned pick-up.

The following paragraphs explain how to transform the DC output parts of Topologies B, C, D and E to fit the standard series or parallel tuned IPT pick-up models. This is a desirable goal because it will allow the dual output pick-up circuits to be designed using familiar IPT pick-up design rules.

Figure 9:
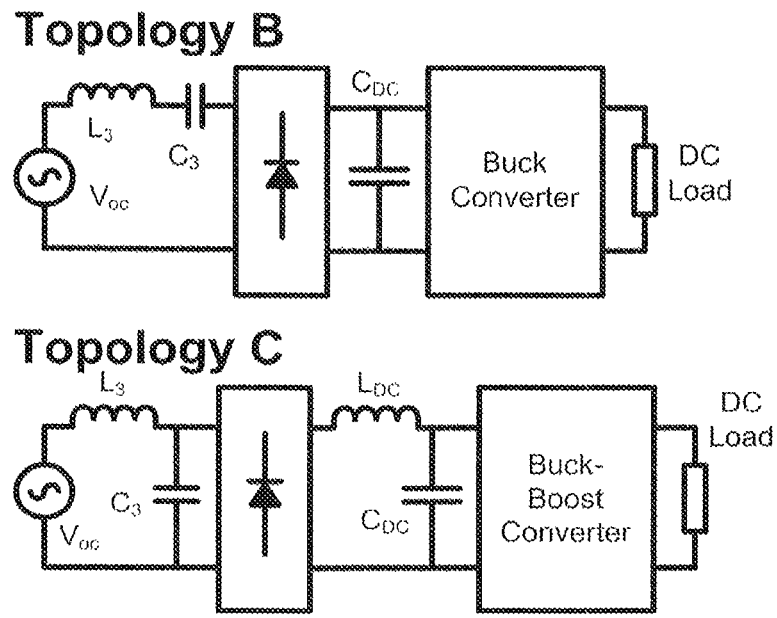
FIG. 9 shows diagrams used for modeling resonant sub circuits in Series tuned pick-ups.

The series tuned pick-up coil (comprising $L_2$ and $C_2$) used in topologies B and C of FIG. 8, can be modelled as a voltage source under steady state conditions as shown more explicitly in FIG. 9. Because the DC and AC output sections of topologies B and C are connected in parallel with each other, this apparent voltage source appears across both of them. However, due to the operating nature of the AC-AC series tuned controller, voltage spikes are created across the series tuned pick-up coil as the switches in the AC-AC controller attempt to regulate (block during part of the resonant cycle) the resonant current to the load during operation.

If any existing voltage spikes are not prevented from entering the DC output section of the pick-up circuit, the components in the DC output section must be rated to handle significantly higher voltages than would otherwise be the case and the cross coupling between both sections will then also increase significantly. In order to block these voltage spikes from entering the DC output section, an inductor must be used in series with any current drawn from the compensated pick-up coil.

Topology B of FIG. 9 uses a series inductor-capacitor arrangement to block the voltage spikes and reduce the cross coupling, while still allowing the DC controller to draw current without its input voltage sagging significantly. As shown the DC output section here is already in the form of a standard series tuned DC output pick-up.

Figure 10:
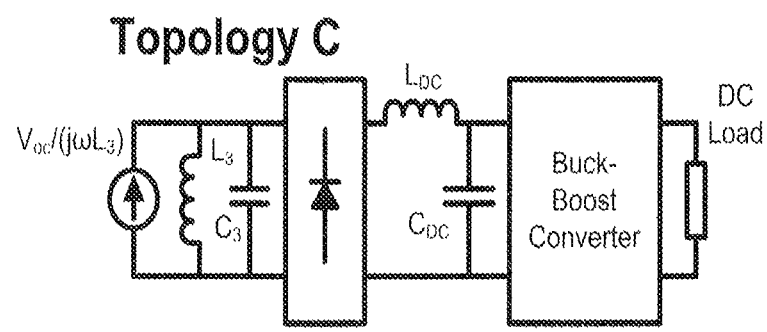
FIG. 10 shows a diagram of a Norton transformation of a resonant sub circuit.

Topology C of FIG. 9 on the other hand uses a "parallel" resonant inductor-capacitor arrangement to boost the voltage without changing the available current. Topology C can be transformed into the standard parallel tuned pick-up by performing a Norton transform on the series voltage source to replace it with a parallel current source, the result of which is shown in FIG. 10. This puts the pick-up into the standard form as is normally analysed for a parallel tuned circuit with constant current input. The value of the current source created in the Norton transform is $V_{oc}/X_{L3}$. As can be seen, parallel tuned pick-up coil topologies are "duals" of the series tuned topologies.

Figure 11:
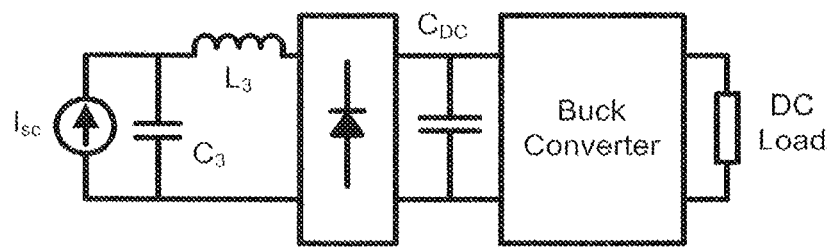
FIG. 11 shows diagrams for modeling resonant sub circuits and parallel tuned pick-ups.
Figure 11:
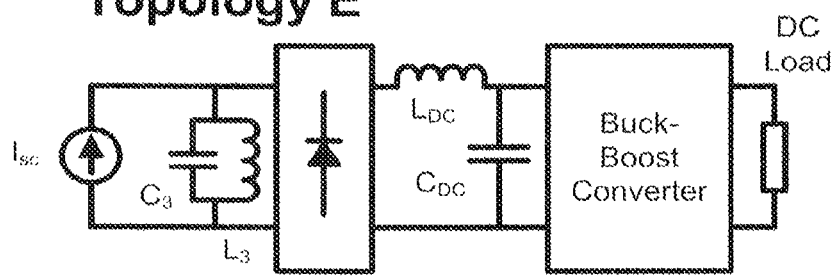

Because topologies D and E (FIG. 8) use a parallel tuned pick-up coil, the current drawn from the pick-up coil and compensation capacitor in parallel must be under steady state conditions. Since this steady state current (Isc) must pass through $L_3$, $C_3$ and the rectifier combination in both of these topologies, the steady state DC output branch of the system can be redrawn as shown in FIG. 11.

Figure 12:
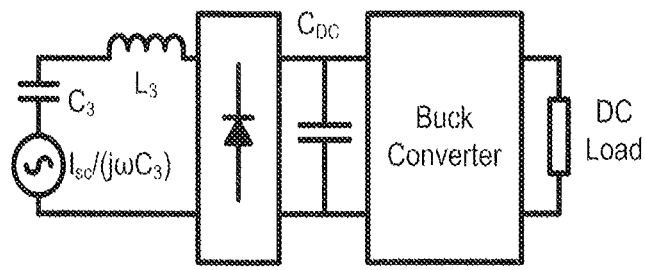
FIG. 12 shows a diagram representing a Thevenin transformation of a resonant sub circuit.

A Thevenin transform can be used on Isc and $C_3$ in Topology D (FIG. 8) so that the parallel current source is transformed into a series voltage source as shown in FIG. 12 where the open circuit voltage $V_{oc} = I_{sc} X_{C3}$. The resulting circuit is now in the form of a standard series tuned buck converter controlled pick-up.

Topology E requires no additional transformation because it is already in the form of the standard parallel tuned pick-up although here a buck-boost controller would be required to meet the design specifications rather than a boost controller, given there is a desire to boost the output current.

Design Equations for a Practical Dual Output Circuit

A circuit for outputting 220V, 1.2 kW AC and 24V, 200 W DC, as required by an intelligent lighting rig running with a commonly used 220V tungsten-halogen bulb, is analyzed in depth in this section. Topology D from FIG. 8 has been selected as a suitable option to achieve acceptable efficiency, having component ratings which are easily met and a minimum of bulky components, as described earlier.

Topologies B through E (shown in FIG. 8) have many different combinations of L3 and C3 that will result in a working system, as long as they resonate together at the track frequency. Therefore, investigation must be under-taken to determine the combination of L3 and C3 which minimizes the cost of components, results in minimal cross coupling between AC power output and DC power output, and maximizes efficiency.

FIG. 12 shows the DC output part of Topology D, rearranged to make analysis simpler, as described earlier. The circuit shown in this figure is used in subsequent analysis within this section. The open circuit voltage for this circuit is denoted $Voc_3$ and is defined as: $V_{oc,3} = I_{sc} X_{C_3}$ In this example $I_{sc,3}$ is defined as the short circuit current in $L_3$ in series with voltage $Voc_3$ without compensating capacitor C. $I_{sc,3}$ should be distinguished from Isc, which is the short circuit current of pick-up coil L2 when placed on the primary track.

Here $I_{sc,3} = -V_{oc}/X_{L_3} = -I_{sc} X_{C_3}/X_{L_3}$. The negative sign refers to the direction in which $I_{L3}$ is measured and is therefore arbitrary. Since $C_3$ and $L_3$ are chosen to resonate with each other, $X_{C_3}/X_{L_3} = -1$. Therefore, $I_{sc,3} = I_{sc}$.

The rectifier bridge and subsequent circuitry can be modelled as a resistor as discussed earlier. This equivalent AC resistor is here denoted $R_3$. The power dissipated in resistor $R_3$ is therefore $$P_{R3} = |I_{sc} X_{C3}|^2 / R_3$$

Thus, $$R_3 = I_{sc}^2 X_{C3}^2 / P_{R3}$$

The quality factor of the resonant circuit shown in FIG. 12 can also be denoted as $Q_3$ here and can be defined as the ration of the resonant inductor current $I_n$ to the short circuit current of L3 Isc.
Therefore, $$Q_3 = I_{L3}/I_{sc} = X_{C3}/R_3$$

Thus:

$$I_{L3} = I_{sc} X_{C3}/R_3$$

To minimize component cost and system size, inductors L2 (the pick-up coil inductor) and L3 should be made as small as possible. As a rough metric, inductor volume and cost can be said to be a monotonically increasing function of the energy stored in the inductor, $LI^2/2$. Thus, a quantity $G_L = L I_L^2$ is defined to represent the relative volume and cost of inductors, where smaller is better.

Consequently, $$G_{L2} = L_2 \frac{X_{C3}^2 I_{SC}^2}{R_3^2},$$

and because of the resonant tuning used, $L_3 = 1/\omega^2 C_3 = jX_{C3}/\omega$
Therefore, $$G_{L2} = \frac{jX_{C3}}{\omega} \frac{X_{C3}^2 I_{SC}^2}{R_3^2}$$

As such $$|G_{L2}| = C_3 \frac{P_{R3}^2}{I_{2C}^2}$$

Because $P_{R3}$ is set at whatever the load requires and Isc is determined by what is best for the high power AC output part of the circuit, this shows that inductor $L_3$'s volume and cost is minimized by making capacitor $C_3$ as small as possible, in other words, by making the capacitor's impedance as large as possible. However, the larger $X_{C3}$ is, the larger $V_{c3}$ will be, leading to greater voltage across the pick-up coil inductor $L_2$.

The impedance of the DC output section, as seen by the rest of the pick-up circuit, can be defined here as $Z_3$, and is composed of the impedance of capacitor $C_3$ in parallel with the series impedance of inductor $L_3$ and resistor $R_3$. Therefore, $$Z_3 = \frac{L_3}{R_3 C_2} - j\frac{1}{\omega C_3} = \frac{P_{R2}}{I_2^2} - j\frac{1}{\omega C_3}$$

This defines the relative real and reactive load imposed by the DC output section on the pick-up inductor and parallel resonant capacitor. Because DC power output and the pick-up coil's short circuit current are set by external factors, this shows that the real impedance of the DC output branch, is outside of the control of the designer. However the total load presented by the DC output branch can be minimized by making $C_3$ as large as possible. By minimizing the load presented by the DC output branch, the voltage across the pick-up coil inductor can be reduced, thus reducing its cost and size. Finally, the reactive impedance of the DC output branch is independent of the DC power drawn, thus changes in DC power output should not affect the AC power output.

As shown above, minimizing the size and cost of the resonant inductor in the DC output section ($L_3$) comes at the cost of increasing the cost and size of the pick-up coil inductor. However, for small values of $X_{C3}$ relative to $R_{lamp} + P_{R3}/I_2$, the magnitude of the total impedance presented to the parallel tuned pick-up coil will increase very slowly with increasing $X_{C3}$, because the real and reactive impedances are at right angles. For example, if $|X_{C3}|$ was 5 times smaller than the sum of the total real load impedance of the AC and DC circuits, the increase in total load impedance would be 2%. Thus, as long as $X_{C3}$ remains small relative to the real AC and DC loads, no significant increase in the rating of the pick-up coil inductor L2 will be required.

Without active rectification, the efficiency of the rectifier bridge in the buck converter will increase as the input voltage increases. Thus an input voltage Voc3 significantly higher than the output 24V should be used for improved efficiency. Once $C_3$ is chosen, design of the DC output section can proceed for a standard series tuned pick-up.

Simulated Results for a Practical Dual Output Circuit

An IPT pick-up based on Topology D, as shown in FIG. 8, capable of 1.2 kW, 220V AC output as well as 200 W, 24V DC output has been designed and simulated. The results of this simulation are given in this section.

Simulation Setup and Verification of Circuit Equations

Figure 13:
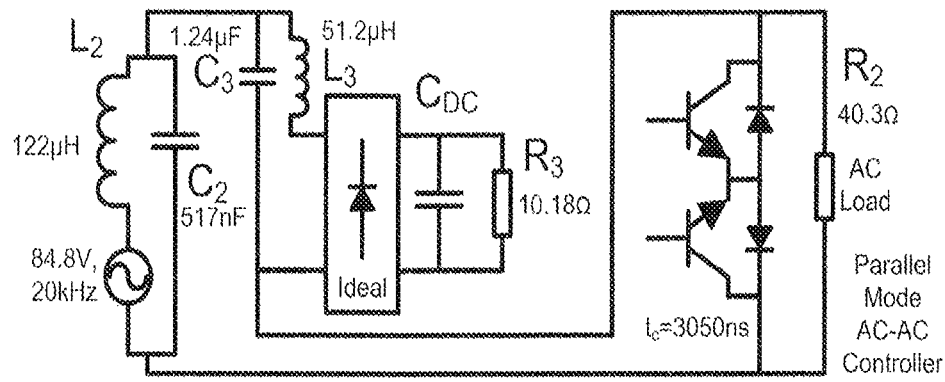
FIG. 13 shows a diagram for a simulation including the circuit parameters.
Figure 14:
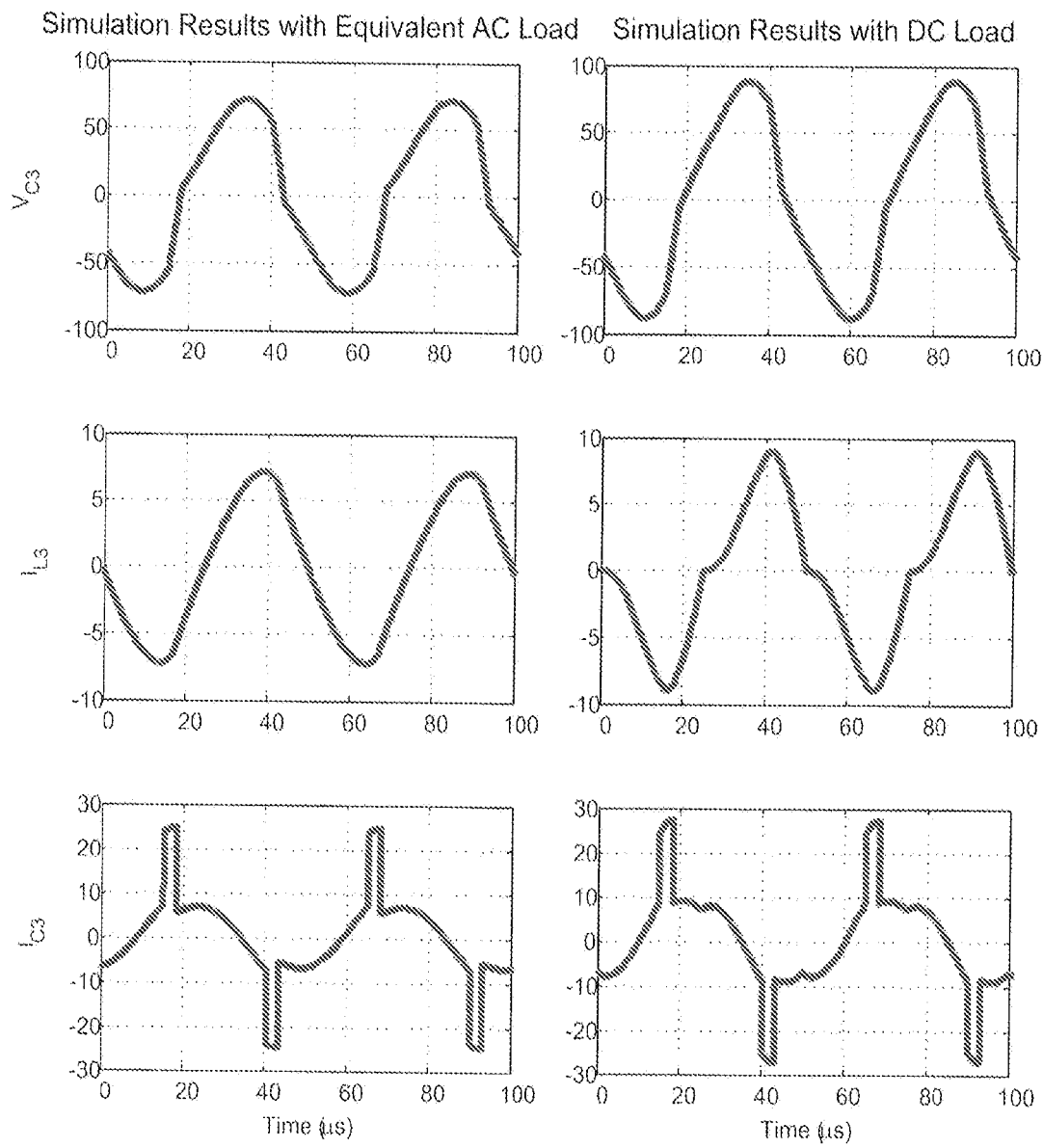
FIG. 14 shows diagrams of voltage and current against time for simulation results relating to the circuit topology shown in FIG. 13.

The circuit diagram showing critical design parameters is shown in FIG. 13 This circuit uses the same pick-up coil structure as described earlier in Table 1, but with the number of turns adjusted to make the short circuit current 16% higher than the rated current of the lamp.

To show that the DC output branch of the pick-up works as expected in spite of the clamping action of the AC-AC Processing branch, clamp times of 30-50 ns are used in the simulation. This limits the output AC power to the rated power of the lamp.

Using the above equations and comparing with the simulation results taken from the circuit of FIG. 13 the closeness of fit of the equations can be determined. These results are given in Table 4. The table shows two sets of simulation results: one using the equivalent AC load in place of the rectifier and DC load, and one with the DC load. As shown in the table, when the equivalent AC load is used, the calculated values correspond very well with the simulated results, to an accuracy of 1% or better. However, when a DC load is used, the fit is not as good. $V_{C3}$ is 13.7% higher than predicted above, and $I_{L3}$ in simulation is 9.47% higher than the calculated value.

TABLE 4

Comparison of Equation and Simulation for Topology D

| Measurement | Equation No. | Calculated | Simulated | Δ |
|---|---|---|---|---|
| With the equivalent AC load | | | | |
| PR3 (W) | (5.5) | 200 | 198 | −0.995% |
| $V_{C3}$ (V) | (5.12) | 51.7 | 51.8 | 0.068% |
| IL3 (A) | (5.8) | 4.92 | 4.87 | −0.415% |
| With the DC load | | | | |
| PR3 (W) | (5.5) | 200 | 197 | −1.38% |
| $V_{C3}$ (V) | (5.12) | 51.7 | 58.8 | 13.7% |
| IL3 (A) | (5.8) | 4.92 | 5.39 | 9.47% |

The simulation results are shown in FIG. 11 with the equivalent AC load and the DC load, shown side by side for comparison. As can be seen, the peak voltage and currents are higher in $C_3$ and $L_3$ when DC output is used, compared to when the equivalent AC resistor is used. The $LI_2$ value of $L_3$ is around 2% of the $LI^2$ value of the pick-up coil, $L_2$. This suggests that $L_3$ will not add significantly to the total system cost or volume.

Minimising Cross Coupling from DC Output to AC Output

As discussed earlier, there needs to be a minimum of cross coupling between changes in DC load and the AC output power to help simplify the controller design.

Figure 15:
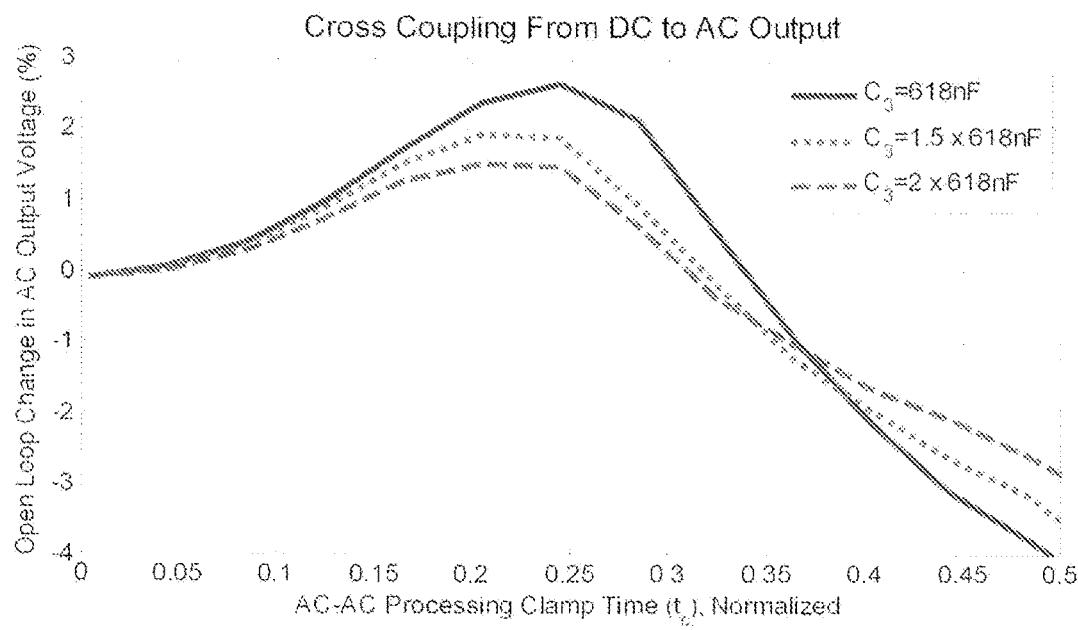
FIG. 15 is a diagram showing cross coupling from DC output power to AC output voltage in the circuit topology of FIG. 13.

FIG. 15 shows the percentage change in output AC voltage as the DC load is stepped from 0 W to 200 W. The change is shown with the AC controller operating over a range loads (with varying clamp periods), corresponding to the lamp being fully on to faintly glowing. The simulations also look at various selections of $C_3$. As can be seen, the cross coupling from DC output power to AC output voltage is reduced if the impedance of capacitor $C_3$ is also reduced.

When the impedance of $C_3$ is less than 38% of the combined real impedance of the AC and DC output branches, the voltage cross coupling effect from DC to AC remains less than 4% over relevant power levels. $X_{C3}$ is 38% of the combined real impedance of both AC and DC output branches when C3=618 nF (FIG. 5.12). Voltage feedback in the AC-AC Processing circuit, could be used to correct this minor cross coupling effect if required.

Figure 16:
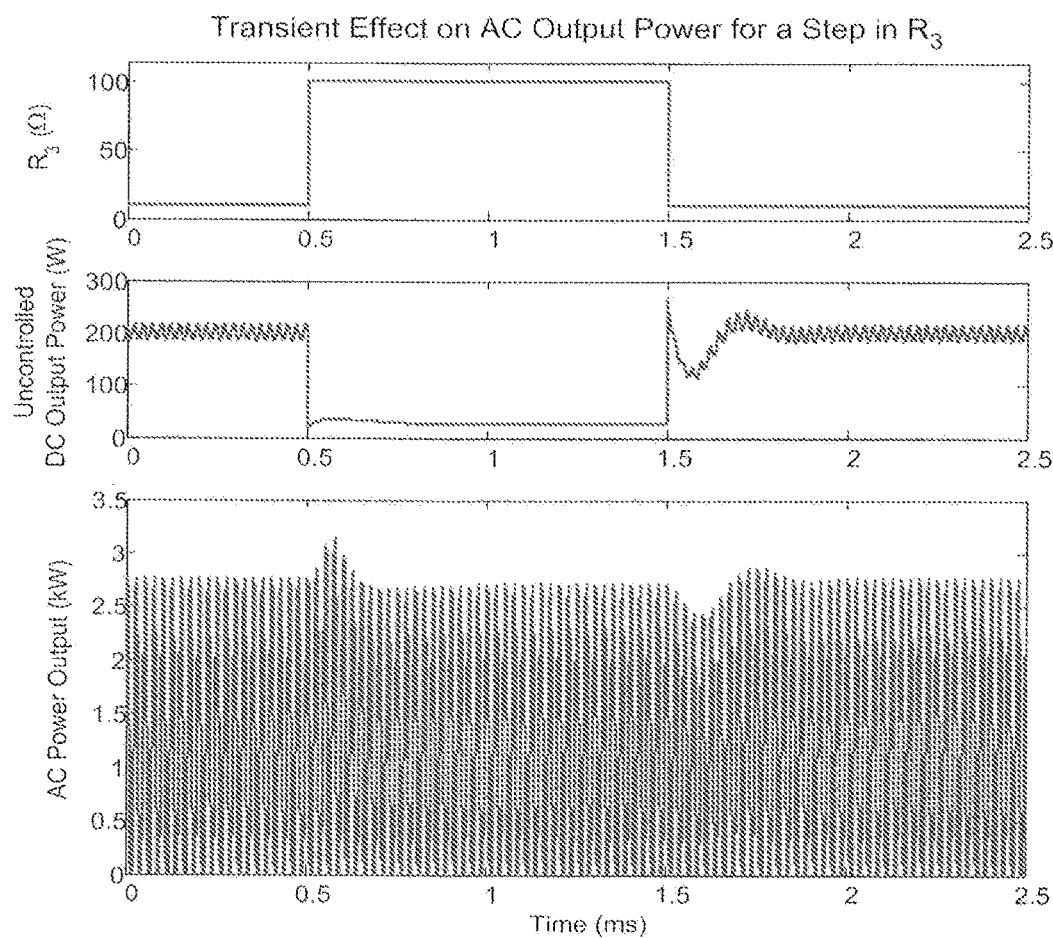
FIG. 16 shows diagrams of transient cross coupling from DC load to AC output power in the topology of FIG. 13.

While the cross coupling is minimal under steady state conditions, there is significant transient cross coupling from the DC to the AC output power. This is shown in FIG. 16 It is not anticipated that this would be a problem in many applications such as stage lighting as the transients decay rapidly as the steady state power output is reached. The simulation parameters used to generate FIG. 16 re also given in FIG. 13

Figure 17:
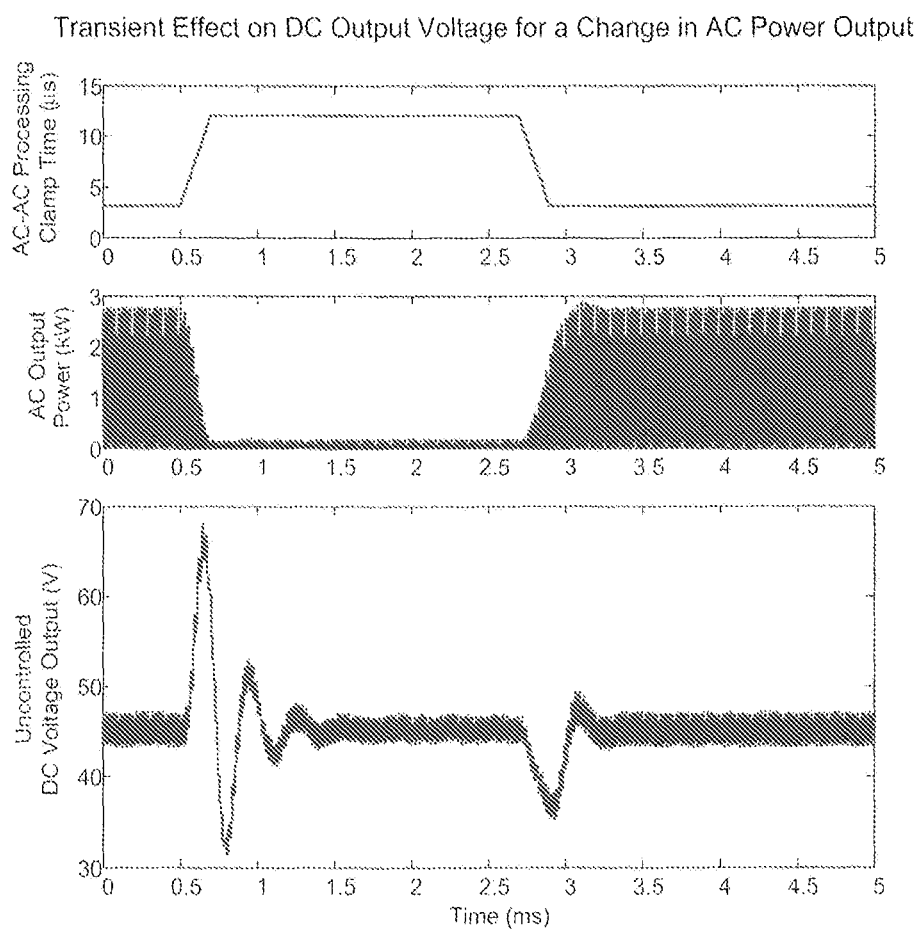
FIG. 17 shows diagrams relating to transient cross coupling from AC power output to $V_{R3}$.

The steady state cross coupling from changes in AC output power to the DC voltage across $R_3$ is minor, however because of the lack of a DC regulator there is again significant transient cross coupling in the DC output voltage as shown in FIG. 17. In consequence there is a clear need for a buck converter to maintain the desired DC output voltage after the rectifier bridge and before the DC load. This is possible as long as the input voltage stays within its rated limits. Therefore, with careful design this cross coupling should have little impact on the DC output.

Evaluation of a Prototype Dual Output Pick-Up Circuit Design

Figure 18:
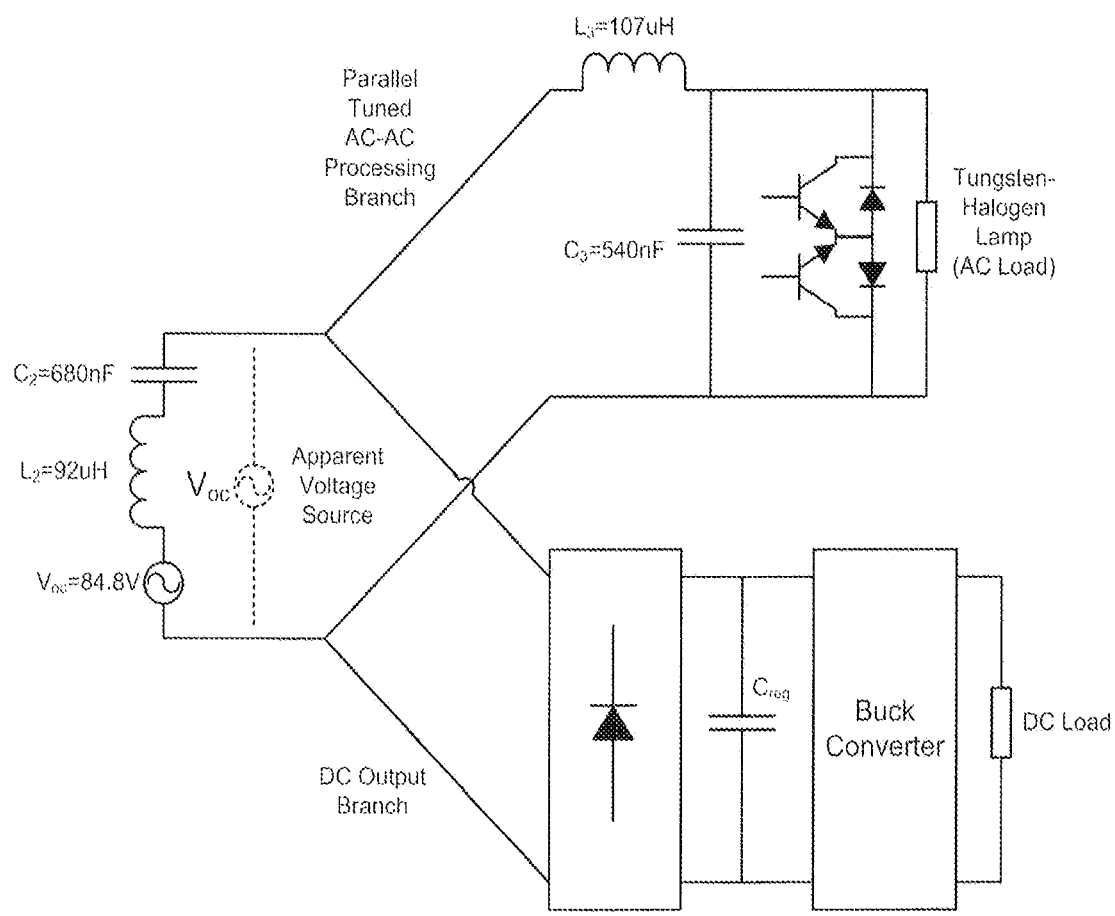
FIG. 18 shows a diagram for providing a dual output using parallel paths (relating to topology A of the earlier figures).

Topology A (while not an ideal choice from a cost or size minimization point of view) was constructed to provide a proof of concept for test purposes. The circuit is shown in FIG. 18 In practice if Topology D or E were constructed the main benefit would be that the physically large inductor $L_3$ of Topology A would be exchanged for a much smaller $L_3$ inductor. Because the DC output section must provide 24V using a buck converter and the AC output section must provide 220V using a parallel resonant (voltage boosting) branch, the open circuit voltage of the pick-up coil was designed to be in between these extremes, at 84.8V. Inductor L3 is then chosen to limit the short circuit current which can be supplied to the lamp to 1.16 times the rated current of the lamp, or 6.33 A. The short circuit was chosen to be 16% greater than the rated current of the lamp to decrease the time taken for the lamp to come to full brightness. The pick-up coil used was the 39 mm thick coil detailed in Table 1. Although the power output requirement of 200 W for the DC output section is significantly less than the power required of the AC output section, the current required of the DC output section is larger than the required AC current. For the 220V OSRAM bulb, the current required to run the light at full power is 5.45 A. The short circuit current of the pick-up coil is chosen to be larger than at 6.33 A to enable the light to reach full power quickly. Despite the larger short circuit current shown in this application, the current required by the 200 W, 24VDC load is higher still at 8.3 A and therefore a circuit capable of boosting the output current is required as described earlier.

In the situation where relatively large DC currents at low voltages are required, producing a DC output from the AC-AC Processing pick-up by rectifying the output AC current and filtering can produce a bulky, expensive system. Larger filter components will be required to filter track frequency AC than when using a dedicated DC-DC converter circuit. This is because the track frequency is fixed at 20 kHz, but a DC-DC converter can easily operate at five to ten times this frequency, minimizing inductor and capacitor volume and cost. For this reason, a buck converter switching at 100 kHz was used in this prototype. As in standard series tuned IPT pick-ups, $C_{reg}$ in FIG. 18*must* be selected carefully to control in-rush currents and voltage overshoot at start-up. A value of 5 µF was used in this case.

The AC-AC Processing branch of the prototype pick-up circuit is substantially identical to that of WO2010/030195. The short circuit current ($=V_{oc,3}$/j $\omega L_3$) was set to be 16% greater than the rated current of the AC load.

Figure 19:
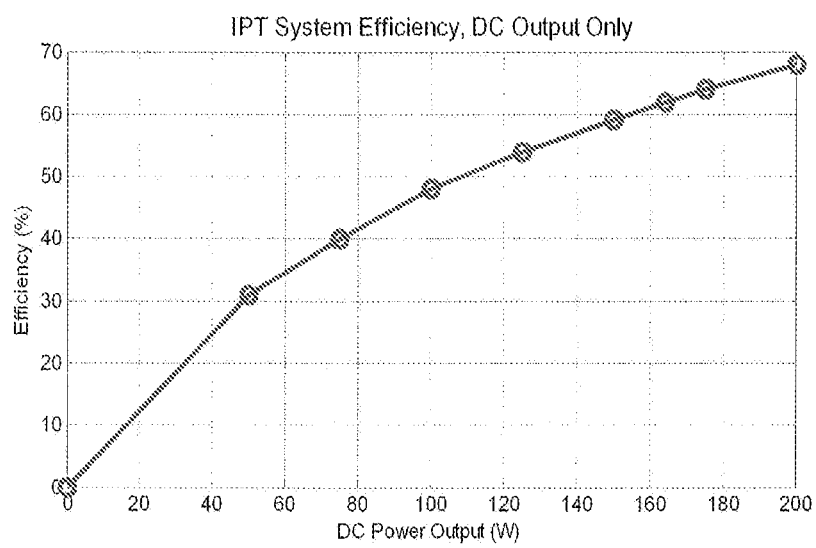
FIG. 19 shows diagram of IPT system DC efficiency, 0 watt AC output.

Efficiency measurements were taken with the system of FIG. 18 operating over a range of loads. With AC output power at zero, the IPT system efficiency is limited by the standing losses of the IPT power supply, which are in the order of 100 W. Thus, the IPT system efficiency with 200 W DC output and 0 W AC output is only 68%, as shown in FIG. 19.

The overall IPT system of FIG. 18 however has a measured efficiency of 90.0% when operating at its maximum power output of 1.2 kW AC plus 200 W DC, and this increases to 92% when the AC output is kept to a maximum but the DC output is at zero.

Figure 20:
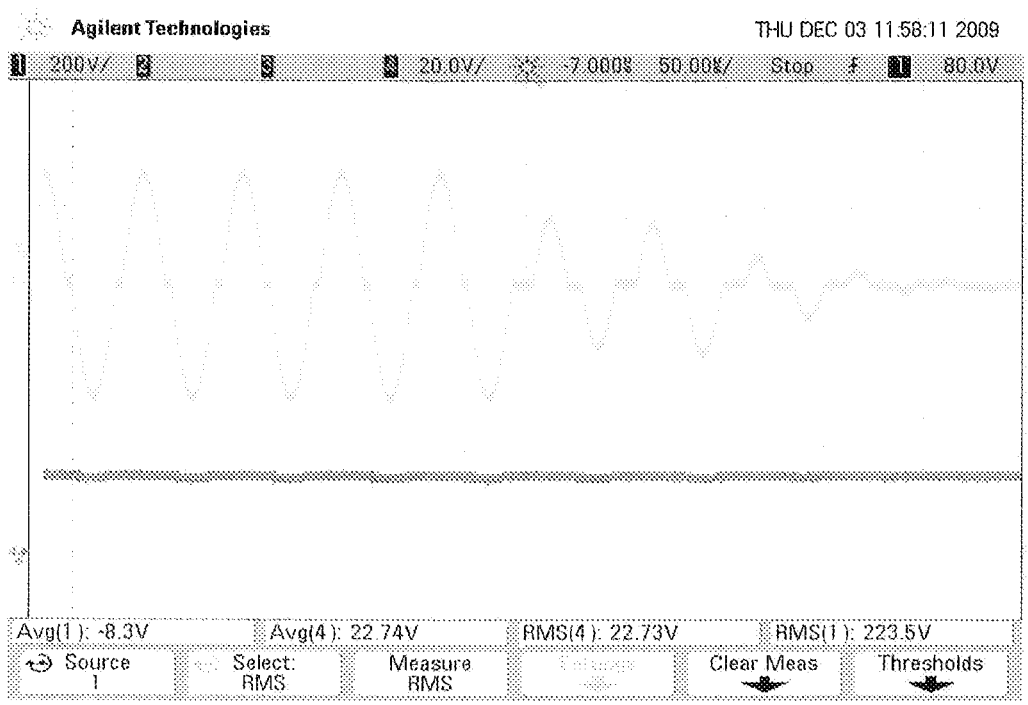
FIG. 20 shows a diagram of DC output from a Buck converter as AC output voltage is reduced.

Operational waveforms are shown in FIGS. 20, 21 and 22. FIG. 20 shows that the DC output voltage from the buck converter remains constant as the AC output voltage is reduced. FIG. 21 shows that the DC output voltage remains constant as the AC output power is increased.

In FIG. 22 a DC load was connected by hand across the output terminals of the buck converter on-board the IPT pick-up. Traces 3 and 4 correspond to the load current and voltage, respectively. It can be seen that connecting the DC load has little effect on the AC output voltage. The jitters at the leading edge of the DC output current and voltage are caused by the DC load's terminals being connected by hand to the output.

It can be seen from the foregoing that the circuits disclosed provide independent output that can satisfy the demands of intelligent lights—i.e. The overall IPT system efficiency with zero AC power and 200 W DC power is 68%, with the standing losses of the IPT power supply accounting for most of the inefficiency. When the system outputs 1200 W AC and 200 W DC simultaneously, the overall system efficiency is 90.0%.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope or spirit of the invention.

The invention claimed is:

1. An inductive power transfer system (IPT) pick-up comprising:
a pick-up coil capable of generating a voltage by magnetic induction from a primary conductive pathway, and a tuning capacitor associated with the pick-up coil to provide a first pick-up resonant circuit;
a first output associated with a first control to substantially control a voltage or current provided by the first output;
a further resonant circuit connected in series or parallel with the first pick-up resonant circuit; and
a second output associated with a second control to control a voltage or current provided by the second output;
wherein the first output and second output are electrically associated with the pick-up coil, the pick-up coil generates an alternating current (AC) output, and the first output is generated from the AC output of the pick-up coil without rectification.

2. The IPT pick-up as claimed in claim 1 wherein the first output and second output are independently controllable.

3. The IPT pick-up as claimed in claim 1 wherein the first output is generated from an output of the first pick-up resonant circuit, and the second output is generated from an output of the further resonant circuit.

4. The IPT pick-up as claimed in claim 1 wherein one of the first output or the second output comprises an AC output, the other of the first output or the second output comprises a DC output, and the DC output is provided by the first or second control functioning as a buck, boost, or buck-boost converter.

5. The IPT pick-up as claimed in claim 4 wherein the AC output is provided by the first or second control introducing a phase delay.

6. A wireless power pick-up, comprising:
a pick-up coil;
at least one tuning capacitor connected to the pick-up coil to form a first resonant circuit with the pick-up coil, wherein the first resonant circuit is configured to supply power to a first electrical output of the wireless power pick-up; and
a second resonant circuit connected to the pick-up coil, wherein the second resonant circuit is configured to supply power to a second electrical output of the wireless power pick-up,
wherein the wireless power pick-up is configured to produce, without rectification, an alternating current (AC) at the first electrical output.

7. The wireless power pick-up of claim 6, wherein the second resonant circuit comprises an LC circuit that is tuned to resonant at a same frequency as the first resonant circuit, and an inductor of the LC circuit is connected in series with the pick-up coil of the first resonant circuit.

8. The wireless power pick-up of claim 6, wherein the first resonant circuit is a series tuned resonant circuit, the first electrical output of the wireless power pick-up is an alternating current (AC) output, and the second electrical output of the wireless power pick-up is a direct current (DC) output.

9. The wireless power pick-up of claim 6, wherein the first resonant circuit is a series tuned resonant circuit, the first electrical output of the wireless power pick-up is an alternating current (AC) output, and the wireless power pick-up is configured to open-circuit the first electrical output for part of a resonant cycle of the first resonant circuit to control the power supplied to a load via the first electrical output, and wherein the wireless power pick-up is configured to continue to supply power to the second electrical output of the wireless power pick-up for the part of the resonant cycle that the first electrical output is open-circuit.

10. The wireless power pick-up of claim 6, wherein the first resonant circuit is a parallel tuned resonant circuit, the first electrical output of the wireless power pick-up is an alternating current (AC) output, and the wireless power pick-up is configured to short-circuit the first electrical output for part of a resonant cycle of the first resonant circuit to control the power supplied to a load via the first electrical output.

11. The wireless power pick-up of claim 6, wherein the wireless power pick-up comprises at least one switch connected in series or in parallel with the first resonant circuit, and wherein the wireless power pick-up is configured to operate the switch to open-circuit or short-circuit the first electrical output, and wherein the wireless power pick-up is configured to supply power to the second electrical output of the wireless power pick-up irrespective of a state of the switch.

12. An inductive power pick-up comprising at least two resonant circuits, wherein a first of the at least two resonant circuits comprises a pick-up coil and at least one tuning capacitor, and a second of the at least two resonant circuits is connected in series or in parallel with the first of the at least two resonant circuits, wherein the inductive power pick-up is configured to produce, without rectification, a controlled alternating current (AC) output from AC power received via the pick-up coil.

13. The inductive power pick-up of claim 12, wherein the second of the at least two resonant circuits comprises at least one inductor and at least one tuning capacitor, and wherein the at least one inductor of the second of the at least two resonant circuits is connected in series with the first of the at least two resonant circuits.

14. The inductive power pick-up of claim 13, wherein the at least one inductor of the second of the at least two resonant circuits is connected in series with the pick-up coil.

15. The inductive power pick-up of claim 12, wherein the inductive power pick-up has at least two electrical outputs that are configured to supply power to an electrical load, wherein the first of the at least two resonant circuits produces an alternating current (AC) output for the first of the at least two electrical outputs, and the second of the at least two resonant circuits produces a direct current (DC) output for the second of the at least two electrical outputs.

16. The inductive power pick-up of claim 15, wherein the inductive power pick-up does not have a rectifier between the first of the at least two resonant circuits and the first of the at least two electrical outputs.

17. The inductive power pick-up of claim 12, wherein the first of the at least two resonant circuits and the second of the at least two resonant circuits are configured to resonate at the same resonant frequency.

\* \* \* \* \*